US010372735B2

(12) United States Patent
Smarr et al.

(10) Patent No.: US 10,372,735 B2
(45) Date of Patent: *Aug. 6, 2019

(54) GENERATING ACTIVITY SUMMARIES

(71) Applicant: Google Inc., Mountain View, CA (US)

(72) Inventors: Joseph Robert Smarr, Half Moon Bay, CA (US); Anand Agarawala, San Francisco, CA (US); Brett Rolston Lider, San Francisco, CA (US); Benjamin David Eidelson, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 14/718,005

(22) Filed: May 20, 2015

(65) Prior Publication Data
US 2015/0339374 A1 Nov. 26, 2015

Related U.S. Application Data

(60) Provisional application No. 62/001,028, filed on May 20, 2014, provisional application No. 62/001,027, (Continued)

(51) Int. Cl.
G06F 16/00 (2019.01)
G06F 16/28 (2019.01)
(Continued)

(52) U.S. Cl.
CPC ............ *G06F 16/287* (2019.01); *G06F 16/26* (2019.01); *G06F 16/44* (2019.01); *G06F 16/955* (2019.01);
(Continued)

(58) Field of Classification Search
CPC ......... G06F 17/30058; G06F 17/30572; G06F 17/30601; G06F 17/30876
(Continued)

(56) References Cited

U.S. PATENT DOCUMENTS 8,180,778 B1    5/2012  Pedersen et al.
8,458,085 B1 *  6/2013  Yakubov ................ G06Q 40/00
                                                              705/35
(Continued)

OTHER PUBLICATIONS

International Search Report & Written Opinion for PCT/US2015/031844, dated Aug. 25, 2015.
(Continued)

*Primary Examiner* — Monica M Pyo
(74) *Attorney, Agent, or Firm* — IP Spring

(57) ABSTRACT

A system and method for generating activity summaries for users. User activity information is received by a user activity information receiver module. Once enough data is received and processed, the data is analyzes and segmented to determine and create an activity summary or story. Content is selected. The selection of the content includes selection of content items, such as multimedia items, e.g. pictures and videos. Secondary information, such as user activity information or location information is analyzed. A story is generated based on the selected content, including the selected content. The story is represented by a display of the selected media and other information associated with the media.

16 Claims, 15 Drawing Sheets

Related U.S. Application Data filed on May 20, 2014, provisional application No. 62/001,029, filed on May 20, 2014, provisional application No. 62/001,038, filed on May 20, 2014.

(51) Int. Cl.

| | | |
|---|---|---|
| *G06F 16/26* | (2019.01) | |
| *G06F 16/44* | (2019.01) | |
| *G06F 16/955* | (2019.01) | |
| *H04L 29/08* | (2006.01) | |
| *H04L 29/06* | (2006.01) | |
| *G06Q 50/00* | (2012.01) | |

(52) U.S. Cl.
CPC ........... *G06Q 50/01* (2013.01); *H04L 65/403* (2013.01); *H04L 67/22* (2013.01)

(58) Field of Classification Search
USPC .......................................... 707/737, 748, 740
See application file for complete search history.

(56) References Cited

U.S. PATENT DOCUMENTS

| | | | |
|---|---|---|---|
| 9,324,115 B2 | 4/2016 | Votaw et al. | |
| 9,591,050 B1* | 3/2017 | Sherrets | H04L 67/02 |
| 10,025,450 B1* | 7/2018 | Lider | G06F 3/0481 |
| 2009/0282144 A1 | 11/2009 | Sherrets et al. | |
| 2011/0093520 A1 | 4/2011 | Doyle et al. | |
| 2011/0161085 A1 | 6/2011 | Boda et al. | |
| 2011/0276396 A1* | 11/2011 | Rathod | G06F 17/30867 705/14.49 |
| 2012/0215639 A1* | 8/2012 | Ramer | G06F 17/30867 705/14.53 |
| 2013/0061296 A1 | 3/2013 | Reddy et al. | |
| 2013/0073976 A1 | 3/2013 | McDonald et al. | |
| 2013/0117365 A1 | 5/2013 | Padmanabhan et al. | |
| 2013/0185198 A1* | 7/2013 | Lorch | G06Q 20/29 705/39 |
| 2013/0290448 A1 | 10/2013 | Work et al. | |
| 2013/0347078 A1* | 12/2013 | Agarwal | H04L 63/00 726/4 |
| 2014/0033074 A1* | 1/2014 | Thibaux | G06F 17/30867 715/753 |
| 2014/0164611 A1 | 6/2014 | Molettiere et al. | |
| 2014/0337328 A1 | 11/2014 | Sarvabhotla et al. | |
| 2015/0088715 A1 | 3/2015 | Votaw et al. | |
| 2015/0106443 A1 | 4/2015 | Jensen et al. | |
| 2015/0106448 A1 | 4/2015 | Ownbey et al. | |
| 2015/0193522 A1 | 7/2015 | Choi et al. | |

OTHER PUBLICATIONS

Google Patent Search Results: determine how each activity summaries are parsed and grouped together, May 18, 2017, 2 pgs.

Extended European Search Report for EP Application No. 15796371.1, dated Oct. 6, 2017, 6 pgs.

Notification of First Office Action in Chinese Application No. 201580020690.X, dated Nov. 29, 2018, 14 pages.

* cited by examiner

GENERATING ACTIVITY SUMMARIES

CROSS REFERENCE TO RELATED APPLICATIONS

The present application claims priority, under 35 U.S.C. § 119, to U.S. Provisional Patent Application No. 62/001,027, filed May 20, 2014 and entitled "Generating Activity Summaries"; U.S. Provisional Patent Application No. 62/001,029, filed May 20, 2014 and entitled "Layout for Displaying Activity Summaries"; U.S. Provisional Patent Application No. 62/001,038, filed May 20, 2014 and entitled "User Interface for Displaying Activity Summaries"; and U.S. Provisional Patent Application No. 62/001,028, filed May 20, 2014 and entitled "Backend Pipeline for Story Generation"; all of which are incorporated by reference in their entireties.

TECHNICAL FIELD

The present disclosure relates to generating activity summaries. More specifically, the present disclosure relates to generating activity summaries based on user activity and multimedia content.

BACKGROUND

Social networks are becoming an increasingly popular way for people to stay connected. This increasing popularity of social networks has given rise to many social network services that have developed various ways users of the social network can communicate and share information. Users within a social network can send each other messages, monitor other users' activities on a daily basis and share personal information, including personal photographs and videos. Social networking services have provided a great forum for users to remain in close contact despite geographic distance or uncoordinated schedules. Further, the development of other online services that enable the general sharing of information has also increased. The ability for users to share information with others, and view information about others is available in many different venues.

Users of social networks also participate in many activities or online activities, such as watching videos, posting pictures, posting notification of current user information or activity, or sharing location whereabouts. Within such venues of these social networks, users are able determine what information they chose to share and how and to whom that information is shared. Typically, the information may be shared on a social network portal of a user as the user decides to share the information, but the shared information is typically not organized in a meaningful or interesting way.

SUMMARY

The present disclosure relates to generating activity summaries. More particularly, the present disclosure relates to generating activity summaries using digitally recorded information and other information. Still more particularly, the present disclosure relates to generating activity summaries using multimedia content and user activity information.

In general, one innovative aspect of the subject matter described in this disclosure may be embodied in methods that may include receiving user activity information. The user activity information may include activity information of a user's online activity. Once enough data or activity information is received, the data is analyzed and segmented to determine and create an activity summary or a story. Content is selected. The selection of the content includes selection of content items, such as multimedia items, e.g. pictures and videos. Secondary information, such as user activity information or location information is analyzed. A story is generated based on the received user activity information.

In one implementation, the method includes enriching the content with additional information about the content. In another implementation, the method further includes assigning a title to the story.

In another implementation, the method may further include categorizing the user activity information, generating an activity summary, wherein the activity summary includes the categorized user activity information, and sending the activity summary for display.

These and other implementations may provide one or more of the following features. The method may further include grouping the categorized user activity information in accordance with commonalities. The method may also include determining the beginning of a grouping. The method may also include ranking the grouped user activity information according to relevance to the user and/or user's contacts. Further the method may include determining when the group is complete. The method may also include associating a verb identifier with a user activity and categorizing the user activity information according to the verb identifier. In some implementations, the activity summary includes more than one type of user activity. In some implementations, the method may include allowing the user to share the generating activity summary with other users.

These and other implementations may provide one or more of the following features. According to one innovative aspect of the subject matter described in this disclosure, a computer program product comprises a non-transitory computer readable medium encoding instructions that, in response to execution by a computing device, cause the computing device to perform operations comprising receiving user activity information, categorizing the user activity information, generating an activity summary, wherein the activity summary includes the categorized user activity information and sending the activity summary for display. The user activity information includes activity information of a user's online activity.

These and other implementations may provide one or more of the following features. In some implementations, the instructions of the computer program product may further cause the computing device to further perform grouping categorized user activity information in accordance with commonalities. In some implementations, the instructions of the computer program product may further cause the computing device to further perform ranking the grouped user activity information according to relevance to the user and/or user's contacts. The instructions of the computer program product may further cause the computing device to further perform determining when the group is complete. The instructions of the computer program product may further cause the computing device to further perform associating a verb identifier with a user activity and categorizing the user activity information according to the verb identifier. In some implementations, the instructions of the computer program product may further cause the computing device to further perform allowing the user to share the generating activity summary with other users. In some implementations the activity summary includes more than one type of user activity.

A system for generating activity summaries for users is also disclosed. User activity information is received by a user activity information receiver module. The user activity information includes activity information of a user's online activity. The user activity information is then categorized by a categorization module, which in some implementations, also groups the categorized user activity information in accordance with commonalities identified among the user activity information. In some implementations, the categorized user activity information is ranked according to relevance to the user by the ranking module or according to relevance to the user's contacts by the categorization module. An output generation module 316 determines when the groupings are complete. Activity summaries are then generated by the output generation module 316. The activity summary includes the categorized user activity information. The activity summary is sent for display on a user device of a user.

These and other implementations may provide one or more of the following features. In some implementations, the categorization module further associates a verb identifier with a user activity, and categorizes the user activity information according to the verb identifier. In some implementations, the activity summary generation module allows the user to share the generating activity summary with other users.

These and other implementations may provide one or more of the following advantages. Activity summaries may be generated that summarize user activity information, or digitally recorded information, or inferred activity. For example, activity information may be anything that is digitally record or inferred and authorized by the user to analyze and share. Such information may be based on a user's life and based on their digital footprints, for example, location tracks, search history, web history, check-ins, posts created, documents created, web pages bookmarked, keep reminders made, photos and videos taken (and all their metadata like time of day and geocode), etc. Additionally, there may be information from content, such as multimedia (photos, videos) that contain information to provide an inference of time of day or landmarks or specific places (when geocode is missing). In some implementations, activity summaries may be generated that summarize the user's real-world activity. In some implementations, a mobile application is implemented on a mobile device that is carried by the user, and that application has access to the phone's location, then activity can be directly inferred. These summaries may organize the user's activity, including online activity and group them into interesting stories that convey the user's experiences, which may be helpful in conveying interesting life experiences.

BRIEF DESCRIPTION OF THE DRAWINGS

The implementations are illustrated by way of example, and not by way of limitation in the figures of the accompanying drawings in which like reference numerals are used to refer to similar elements.

DETAILED DESCRIPTION

Figure 1:
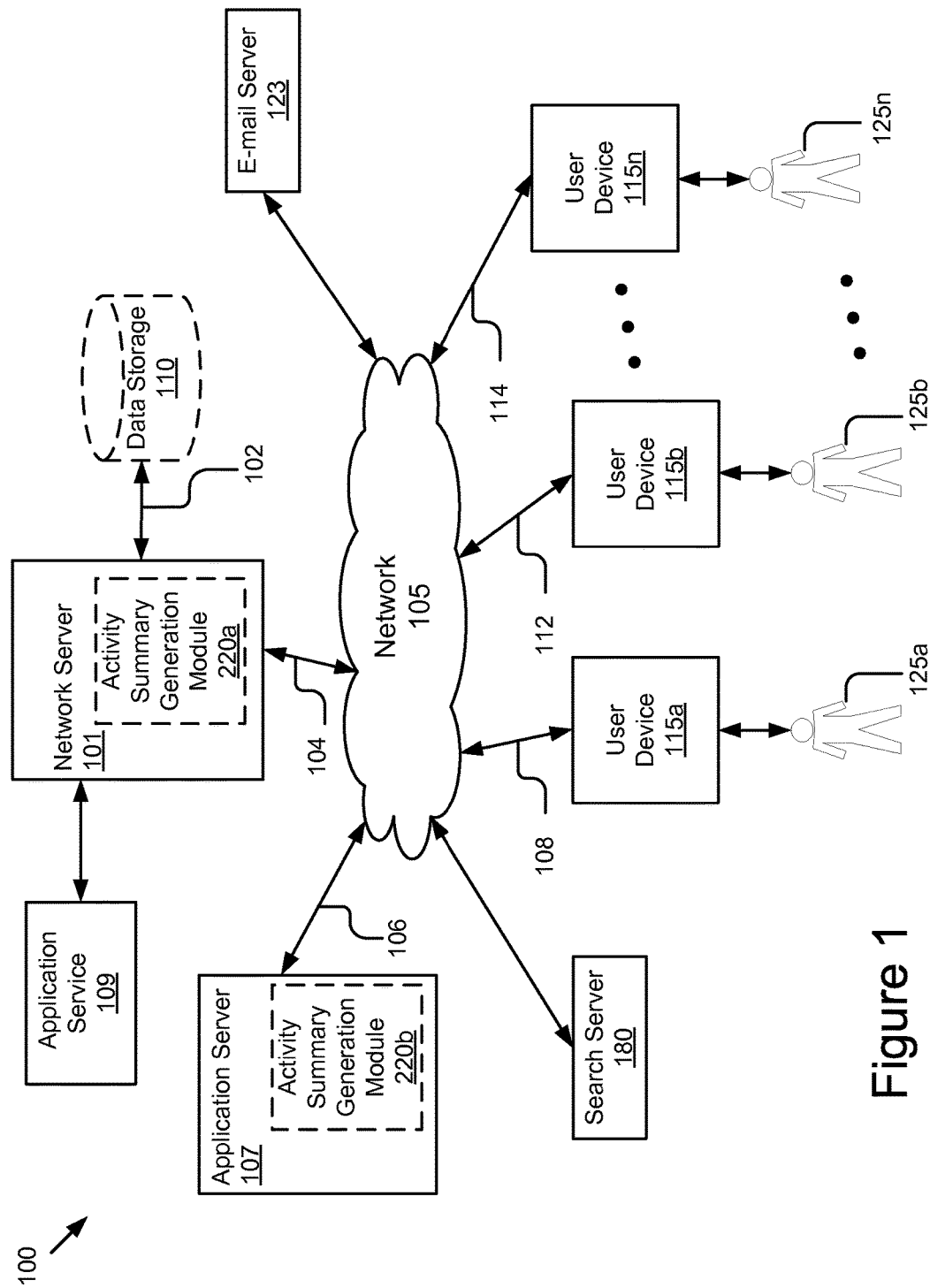
FIG. 1 is a block diagram illustrating an example of a system for generating activity summaries.

A system and method for generating activity summaries is described. An activity summary may be a visual representation of a story. For example, an activity summary may be a collection of content, e.g., pictures, videos, text, specifically selected and organized to tell a story. Such a collection of content may be supplemented with additional information to further enhance and enrich the story.

In one implementation, an activity summary may be generated based on user activity information and content generated from a single user activity. In another implementation, an activity summary may be generated based on user activity information and content generated from a grouping of multiple user activities. Examples of such user activity include interactions with content, e.g., watching videos, posting pictures, posting notification of current user information or activity, sharing location whereabouts, or other activity performed online. In some cases, two or more activities can be categorized and grouped according to one or more commonalities. For example, videos a user watched can be grouped together. As another example, activities associated with a particular even a user has attended or trip the user has taken (e.g., pictures taken on the trip, locations identified, or restaurants visited during the trip) may be grouped together.

An activity summary may also be generated based on user activity information and/or content generated from multiple users. In this manner, content from a second user may be used to tell the story of a first user. For example, shared photos of an event from multiple users may be used to generate an activity summary.

In some non-limiting implementations, the system may suggest that the user share the generated activity summary with one or more persons or groups. This beneficially allows a user to display certain activity information in a way that is more interesting for the user's contacts to view.

In the following description, for purposes of explanation, numerous specific details are set forth in order to provide a thorough understanding of the implementations. It will be apparent, however, that the implementations can be practiced without these specific details. In other instances, structures and devices are shown in block diagram form in order to avoid obscuring the implementations. For example, the present disclosure is described in one implementation below with reference to user interfaces and particular hardware.

However, the present disclosure applies to any type of computing device that can receive data and commands, and any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Furthermore, implementations can take the form of a computer program product accessible from a non-transitory computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present implementations are not described with reference to any particular programming language. It will be appreciated that a variety of programming languages may be used to implement the teachings of the implementations as described herein.

FIG. 1 is a block diagram illustrating an example of a system 100 for generating activity summaries. The illustrated system 100 includes user devices 115a, 115b, and 115n (also referred to collectively as user devices 115 or individually as user device 115) that are accessed by users 125a, 125b, and 125n (also referred to collectively as users 125 or individually as user 125), a network server 101, an application server 107, an e-mail server 123 and a search server 180. In the illustrated implementation, these entities are communicatively coupled via a network 105. Although only three user devices 115a/115b/115n are illustrated, any number of user devices 115a/115b/115n are available to any number of users 125a/125b/125n.

The illustrated implementations of a system 100 includes user devices 115a, 115b that are accessed by users 125a, 125b, a network server 101 that is coupled to data storage 110 and an application server 107. In the illustrated implementation, these entities are communicatively coupled via a network 105. The user devices 115a, 115b, 115n in FIG. 1 are used by way of example. While FIG. 1 illustrates three devices, the present disclosure applies to any system architecture having one or more user devices. Furthermore, while only one network 105 is coupled to the user devices, 115a, 115b, 115n the network server 101 and the application server 107, in practice any number of networks 105 can be connected to the entities.

Although only one network server 101 is shown, it will be recognized that multiple servers may be present. In some embodiments, the network server may be a social network server. A social network is any type of social structure where the users are connected by a common feature. Examples include, but are not limited to, blogs, microblogs and Internet forums. The common feature includes friendship, family, a common interest, etc.

The network server 101 may be coupled to the network 105 via signal line 104. In some implementations, the network server 101 may include a social network module 209 (as will be shown in FIG. 2). Although only one network server 101 is shown, persons of ordinary skill in the art will recognize that multiple servers may be present. A social network is any type of social structure where the users are connected by a common feature. The common feature may include, without limitation, common interests, work connections, family and other relationship connections, e.g., friendship, family, etc. The common features are provided by one or more social networking systems, such as those included in the system 100, including explicitly-defined relationships and relationships implied by social connections with other online users, where the relationships form a social graph. In some examples, a social graph can reflect a mapping of these users and how they are related. Furthermore, it should be understood that, in some implementations, the network server 101 and social network module 209 (FIG. 2) are representative of one social network and that there may be multiple social networks (not shown) coupled to the network 105, each having its own server, application and social graph (not shown). For example, a first social network may be more directed to business networking, a second more directed to or centered on academics, a third is more directed to local business, a fourth directed to dating and others of general interest or a specific focus.

As shown in FIG. 1, network server 101, may include, among various other modules, an activity summary generation module 220a.

Additionally or alternatively, an activity summary module 220b may be included in the application server 107. For purposes of illustration, the activity summary generation modules 220a/220b will be referred to as activity summary generation module 220 as they have similar functionality and function for a similar purpose. More details describing the features and functionalities of these modules will be discussed further below in the detailed description of FIGS. 2 and 3.

The application server 107 may include similar components as the network server 101. Such components as they relate to the network server 101 are described in the description of FIG. 2. The application server 107 may provide services to users of the system 100. The application server 107 may be a third party application server that hosts other third party websites or third party applications. For example, the application server 107 may host a website for user to listen to music, or may host a website for users to watch videos or play games. The application server 107 is communicatively coupled to send information to the network server 101 via the network 105. Such information sent to the network server 101 may be information associated with user activity on the application server 107.

The network 105 enables communications between user devices 115a, 115b, the network server 101 and the application server 107. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another implementation, the entities can use custom and/or dedicated data communications technologies instead of, or in addition to, the ones described above. Depending upon the implementation, the network 105 can also include links to other networks.

In one implementation, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial- or satellite-based transceivers). In one implementation, the network 105 is an IP-based wide or metropolitan area network.

In the illustrated implementation, the user device 115a is coupled to the network 105 via signal line 108. The user 125a can interact with the user device. The user device 115b is coupled to the network 105 via signal line 112. The user device 115n is couple to the network 105 as illustrated by signal line 114. The application server 107 is communicatively coupled to the network 105 via signal line 106. The network server 101 is communicatively coupled to the network 105 via signal line 104. The network server 101 is also communicatively coupled to data storage 110 via signal line 102.

Data storage 110 may store data and information of users 125a/125b/125n of the system 100. Such stored information includes user profiles and other information identifying the users 125a/125b/125n of the system 100. Examples of information identifying users includes, but is not limited to, the user's name, contact information, relationship status, likes, interests, links, education and employment history, location, etc. The information stored in data storage 110 may also include the user's list of current and past friends and the user's activities within the system 100, such as anything the user posts within the system and any messages that the user sends to other users.

Data storage 110 may also store data and information of users 125a/125b/125n of the system 100 received from the application server 107. For example, after obtaining user consent, an application server 107 may be a music streaming application or website, which may send information to data storage 110 that identifies the songs or playlists that were listened to by a user. Data storage 110 may also store multimedia such as pictures or videos that were taken by users 125a/125b/125n of the system 100.

A user device 115a, 115b, or 115n may be an electronic computing device having a web browser for interacting with the network server 101 via the network 105 and is used by user 125*a*, 125*b*, 125*n* to access information in the system 100. The user device 115*a*, 115*b*, 115*n* can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto, or any other electronic device capable of accessing a network. A server can also be a computing device.

Figure 2:
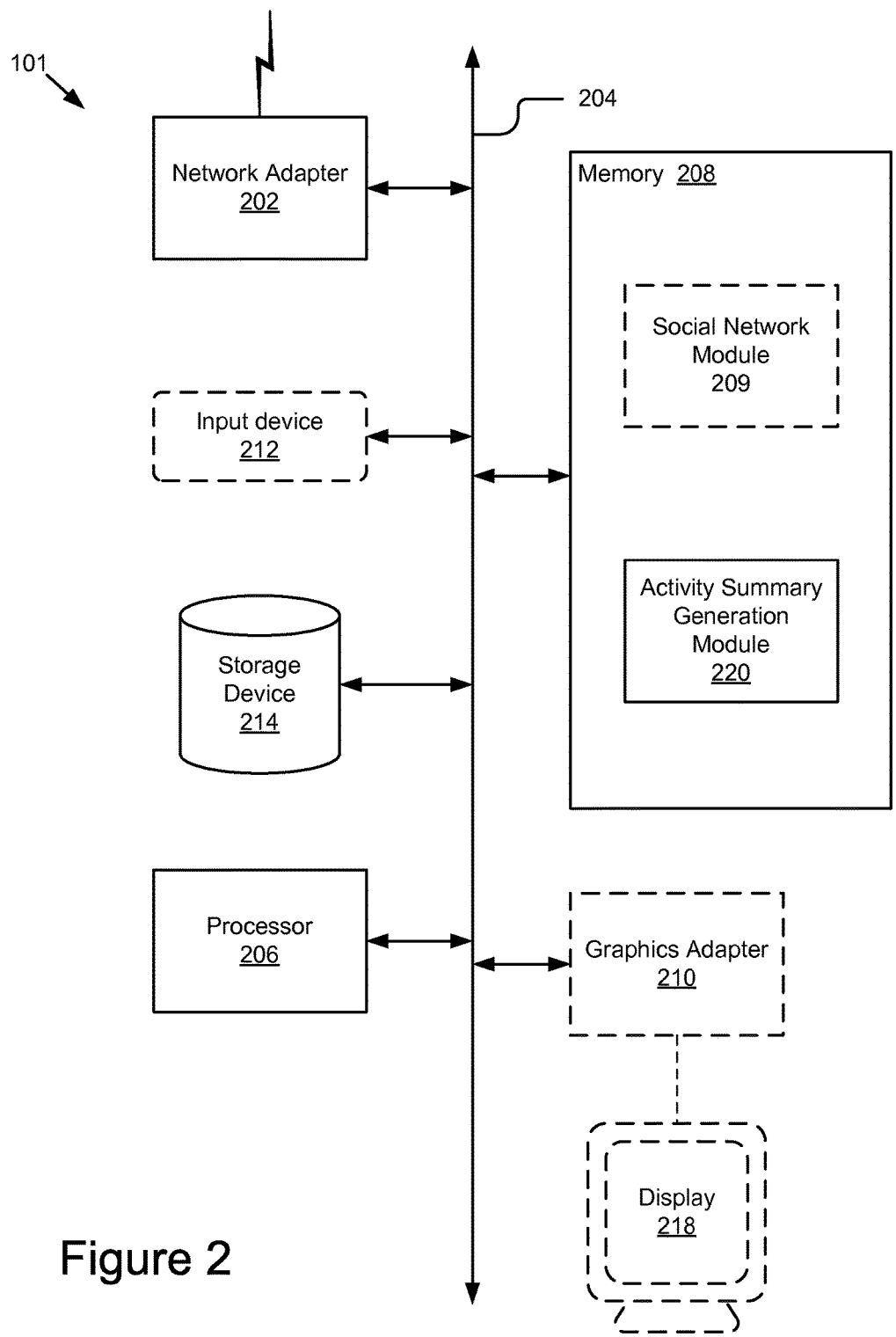
FIG. 2 is a block diagram illustrating an example of a network server device.

FIG. 2 is a block diagram illustrating an example of a network server 101. As illustrated in FIG. 2, the network server 101 includes a network adapter 202 coupled to a bus 204. Also coupled to the bus 204 are at least one processor 206, memory 208, a graphics adapter 210, an input device 212 and a storage device 214. In one implementation, the functionality of the bus 204 is provided by an interconnecting chipset. The network server 101 also includes a display 218, which is coupled to the graphics adapter 210. As illustrated in FIG. 2, memory 208 includes a social network module 209 and an activity summary generation module 220. The network server 101 may include or be communicatively coupled to an application service 109. Such application service 109 may provide other online services to users. The application service is communicatively coupled to the network server 101 and sends information, such as information related to user activity on the application server 109, to the network server 101. More details describing the functionality and components of the activity summary generation module 220 will be described below in the description for FIG. 3.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the user device 115*a*/115*b*. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The user device 115*a*/115*b* also includes an operating system executable by the processor such as but not limited to WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one implementation, the memory 208 also includes a non-volatile memory such as a hard disk drive or flash drive for storing log information on a more permanent basis. The memory 208 is coupled by the bus 204 for communication with the other components of the user device 115*a*/115*b*.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 206 and comprises one or more devices including a hard disk drive, a floppy disk drive, a CD-ROM device, a DVD-ROM device, a DVD-RAM device, a DVD-RW device, a flash memory device, or some other mass storage device known in the art.

The input device 212 may be a mouse, track ball, or other type of pointing device, and is used in combination with another input device 212, such as a keyboard to input data into the network server 101. The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein. The network adapter 202 couples the network server 101 to a local or wide area network.

In one implementation, the social network module 209 is software and/or routines executable by a processor to control the interaction between the network server 101, storage device 214 and the user devices 115*a*, 115*b*, 115*n*. An implementation of the social network module 209 allows users 125*a*, 125*b*, 125*n* of user devices 115*a*, 115*b*, 115*n* to perform social functions between other users 125*a*, 125*b*, 125*n* of user devices 115*a*, 115*b*, 115*n* within the system 100. In some implementations, the social network module 209 may provide the user with an option to opt-in or opt-out of requesting the user activity data from the application server 107 or application service 109.

The activity summary generation module 220 is software and/or routines that, when executed by a processor, generate an activity summary to a user within the system 100. An activity summary may be a grouping of user activity information and content that represents the user's activity. In some implementations, the activity summary is based on the user's activity. More details describing the functionality and components of the activity summary generation module 220 will be described below in the description for FIG. 3.

The network server 101 can have different and/or other components than those shown in FIG. 2. As is known in the art, the network server 101 is adapted to execute computer program modules for providing functionality described herein. As used herein, the term "module" encompasses it plain and ordinary meaning, including, but not limited to computer program logic utilized to provide the specified functionality. Thus, a module can be implemented in hardware, firmware, and/or software. In one implementation, program modules are stored on the storage device 214, loaded into the memory 208, and executed by the processor 206.

Implementations of the entities described herein can include other and/or different modules than the ones described here. In addition, the functionality attributed to the modules can be performed by other or different modules in other implementations. Moreover, this description occasionally omits the term "module" for purposes of clarity and convenience.

Figure 3:
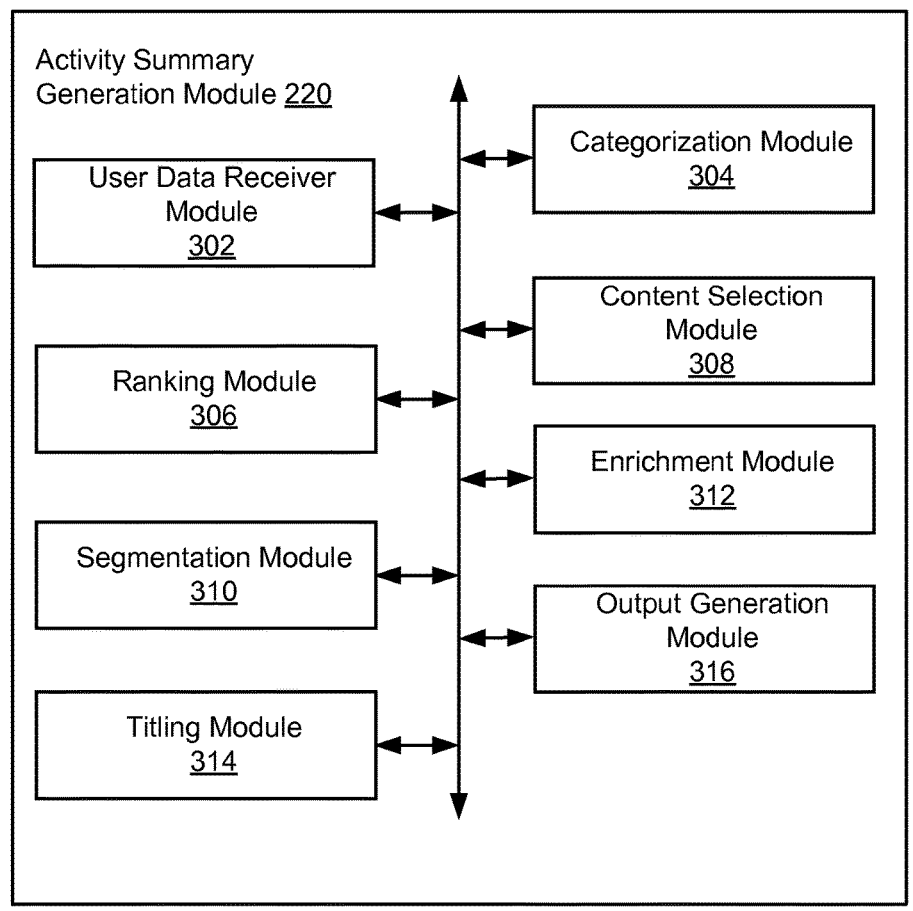
FIG. 3 is a block diagram illustrating an example of an activity summary generation module.

FIG. 3 is a block diagram illustrating examples of modules within the activity summary generation module 220. As stated above, the activity summary generation module 220 may be software and/or routines executable by the processor to generate activity summaries to a user of the system 100. An activity summary may be a grouping of user activity information and content that represents the user's activity. For example, the activity summary may be a representation of songs that the user has listened to that day. As another example, the activity summary may be a representation or summary of the user's activities while the user was on vacation. In some implementations, a particular activity may be associated with a specific action and each activity may be different actions. In such implementations, the activity summary may include multiple actions of a user. The activity summary generation module 220 may include a user activity information receiver module 302, a categorization module 304, a ranking module 306, a content selection module 308, a segmentation module 310, an enrichment module 312, a titling module 314, and an output generation module 316. One or more of these modules may be implemented together and may be embodied as a single module.

The activity summary generation module 220 may be configured to communicate with user devices 115 to receive input from the user devices 115, application servers 107 and/or application services 109. The activity summary module 220 may be configured to communicate with the user devices 115 to send activity summaries for display on the user devices 115. The input received from the user devices 115, application servers 107 and/or application services 109 may include user activity information, which may be activity that the user has performed. The user activity information including, but is not limited to, information associated with audio (for example, songs) that that user 125 has listened to, pictures that the user has uploaded to the network server 101, videos that the user has watched, text posts that the user has input into the network server 101, physical activities performed by the user as determined from accelerometer data (e.g., walking, running, driving, flying), physical activities performed by the user as determined by social networking updates generated by the user (e.g., "went clubbing today"), social networking activities of the user (e.g., reading social networking content, liking social networking content), online activities of the user (e.g., researching a topic), non-online activities of the user performed on a computing device, and other information associated with the activities of the user 125. In some implementations, the activity summary generation module 220 is also configured to communicate with storage device 214 and the data store 110 to send user activity information for storage and retrieval. In some implementations, the activity summary generation module 220 is also configured to communicate with the application server 107 to receive user activity on third party applications.

The user data receiver module 302 of the activity summary generation module 220 is software and/or routines for receiving a user activity information from a user device 115 and user activity information stored on storage device 214 or data storage 110. The user data receiver module 302 may also receive user activity information from application servers 107 and application services 109. The user activity information may be any information associated with the activities of the user when the user is interacting with the application server 107 or application services 109. The user activity information may be information associated with audio (for example, songs) that that user 125 has listened to, pictures that the user has uploaded to the network server 101, videos that the user has watched, text posts that the user has input into the network server 101, and other information associated with the activity of the user 125. Additionally, user activity information may be information received from the application server 107 or application service 109 related to user activity on the application server 107 or application service 109. For example, if the application server 107 hosts a website that allows users to listen to music or watch videos, the user activity information regarding songs listened to or videos watch on the application server 107 may be sent to and received by the user data receiver module 302 of the activity summary generation module 220.

The categorization module 304 of the activity summary generation module 220 is software and/or routines for categorizing the received user activity information. The user activity information may be categorized or indexed according to various categories or criteria. In some cases, the user activity information may be categorized according to a user identifier, a verb identifier associated with the user activity, a target associated with the user activity and a source. For example, a user identifier can be an anonymized identifier that uniquely identifies a particular user 125 of the system 100. The verb identifier associated with the user activity may be predefined according to the particular user activity. In some implementations, if a particular website or a particular application service 109 or application server 107 provides the user with the ability to perform more than one activity on that website, service or server, there may be more than one verb identifier associated with that website, service or server, and each verb identifier may be associated with a certain user activity. For example, if the user activity occurs on a website that hosts videos for viewing, a verb identifier associated with that website and activity may be "watch" or "watched" and the corresponding activity of watching videos that occurs on that website would be associated with "watched." To extend the example, if the website also allows a user to listen to music, the verb associated with that corresponding activity of listening to songs other audio files may be "listen" or "listened." In this example, the website may be associated with various user activities and therefore various corresponding verb identifiers. The target associated with the user activity identifies an item (such as a video in the previous example) that was a target of the user's activity. The target may include a title and a Uniform Resource Locator (ULR) where the target can be found.

The user activity information from multiple servers 107 may have the same associated verb. Similarly, user activity information from multiple application services 109 may have the same associated verb. For example, there may be multiple application servers 107 that allows users to listen to music. In such a case, for user activities associated with these application servers 107, the activity would be categorized using the same verb and therefore the activity would be categorized together, for example, under the verb "listened." The categorization module 304 may also group the categorized user activity. For example, the categorization module 304 may aggregate the categorized based on the type of activity.

The categorization module 304 may also group the categorized user activity based on other criteria and these categorized groups may include different types of user activity or content. The categorization module 304 may also group the user activity information in accordance with commonalities identified among the user activity information. By grouping the user activity information in accordance with commonalities identified among the user activity information, the categorization module 304 helps to organize the user activity or online activity into interesting stories or comprehensive summaries of these activities. This categorized and organized user activity represents experiences and may be helpful in conveying the user's life experiences when the experiences relate to a common theme. The categorization module 304 may group the user activity information based on relatedness (similar topic, similar content, etc.) of the user activity. Commonalities may include a location common to the user activity. Commonalities may also include an interest or topic common to the user activity. Groups of user activity created by the categorization module may therefore include different types of user activity. For example, the categorization module 304 may categorize and group together the user activity that the user performed while the user was in Japan. As such, in this example, the categorized and grouped user activity, which eventually becomes output or is displayed as the activity summary, may include activity and content such as the pictures the user posted of the user's trip to Japan, the places that the user visited while in Japan, and the items the user purchased online while the user was in Japan.

Further, the grouping and categorization performed by the categorization module 304 may be based on session determination and whether the user activity falls within a particular session. The categorization module 304 may also determine sessions of user activity. The categorization module 304 may determine sessions of user activity based on the time the user activity was performed. The time may be based on a certain time frame, for example, every six hours, or based on certain times of the day, for example, from 9:00 AM to 5:00 PM. The categorization module 304 may determine sessions of user activity based on when the user signs off and/or signs in. The sign-on or sign-in may be associated with activity on the application server 107 or application service 109. The session may also be based on other factors, e.g., relatedness of the user activities. For example, relatively continuous user activities that are related to a particular topic or particular type of content can indicate a session.

The ranking module 306 of the activity summary generation module 220 may be software and/or routines for ranking the categorized user activity information. The categorized user activity information may be ranked 406 according to relevance to the user by the ranking module 306. The categorized user activity information may be ranked 406 according to relevance to the user's contacts by the ranking module 306.

The content selection module 308 of the activity summary generation module 220 may be software and/or routines for selecting the content to be included in an activity summary of a user. Content selection may include photo selection, as well as location determination and selection of other content relevant to generating the activity summary. In some implementations, the content selection module 308 of the activity summary generation module 220 may receive user activity information from the user data receiver module 302 as well as multimedia data and secondary data, such as location information or time information and determine which of that content to include in the activity summary. In some implementations, the content selection may be based on a ranking of the content, the quality of the content or other aspects of the content that would render the content valuable for selection to be included in the activity summary.

The segmentation module 310 of the activity summary generation module 220 may be software and/or routines for analyzing the received user activity and content, including received content, such as multimedia or other data or information and determining how the received content relates to each other. In some implementations, the segmentation module 310 of the activity summary generation module 220 may receive user activity information from the user data receiver module 302. In some implementations, the segmentation module 310 of the activity summary generation module 220 may receive selected content from the content selection module 308 of the activity summary generation module 220. In some implementations, the segmentation module 310 may determine commonalities between the content and segment the content based on the commonalities. For example, in some implementations, the segmentation module 310 may determine that the receive content includes pictures that were taken in the same location and segment and group the content (pictures) based on that commonality.

The enrichment module 312 of the activity summary generation module 220 may be software and/or routines for adding additional information to the selected content and multimedia. In some implementations, content recognition is performed on the multimedia. Based on the recognized content and additional search of a database may be performed to obtain additional information about the recognized content. The additional information may be added to the content to further enhance its informational quality. For example, a recognition of a media item may be performed and a picture of the Golden Gate Bridge may be found. The enrichment module 312 may search a database of information and find additional information about the Golden Gate Bridge, for example, how long it is. The enrichment module 312 may then add that information in the form of text to the selected media as part of the activity summary.

In some implementations, the enrichment module 312 communicates with the content selection module 308 to add the information to the selected content. In some implementations, the enrichment module 312 also determines other information from metadata that may be associated with the content and add additional information based on the metadata. In some implementations, the enrichment module 312 of the activity summary generation module 220 may look at location information and determine a specific named location associated with the determined location. For example, the enrichment module 312 may determine that the content received, for example, pictures taken were taken at a specific shopping center and specifically at a certain store. The enrichment module 312 may then use that information and add a map location of the store to the activity summary to enhance the content.

The titling module 314 of the activity summary generation module 220 may be software and/or routines for determining and assigning a title to the selected content of the activity summary. In some implementations, the titling module 314 of the activity summary generation module 220 may analyze the content of the activity summary to determine words and/or phrases to best summarize the content of the activity summary. In some implementations, the titling module 314 of the activity summary generation module 220 determines a time frame for when the activity has taken place and determines a general description to describe that time frame. For example, if the activity took place from Friday at 6:00 pm and ended on Sunday at 12:00 pm, the titling module 314 of the activity summary generation module 220 may assign a title "The Weekend" to the activity summary. In another implementation, the titling module 314 of the activity summary generation module 220 determines the general location of the activity summary. For example, the titling module 314 of the activity summary generation module 220 may assign a title "San Francisco" to the activity summary if it determines that the activity happened mostly in San Francisco. In other implementations, the titling module 314 of the activity summary generation module 220 may use both the determined location and the time frame to determine and assign a title. For example, if the titling module 314 of the activity summary generation module 220 determines that the activity occurred from Friday at 6:00 pm and ended on Sunday at 12:00 pm and took place generally in San Francisco, the titling module 314 of the activity summary generation module 220 may assign the title "Weekend in San Francisco" to the activity summary.

In yet other implementations, the titling module 314 of the activity summary generation module 220 may recognize that the time and/or content described in the story closely matches an event described on the user's calendar (e.g. "Tom's birthday party") or an event the user was invited to and may determine and assign a title also based on the calendar item or event.

In another implementation, the titling module 314 may generate titles in a language-agnostic way so that the title can be translated into whatever language the recipient of the story speaks. As an example, in such implementations, a template may be generated that may be: "Time: [weekend], locations: [San Francisco, Napa]," and based on the generated template, the initial title may be translated and re-assigned to a more naturally-sounding title in whatever language the user normally speaks. Furthermore, in some implementations, the title may be based on the aggregated activity information, for example, based on videos the user watched or music the user listened to. In such examples, in some implementations, the titling module 314 may determine and assign a title "New music you listened to last month" or "Top artists you listened to last week" based on aggregated activity information.

The output generation module 316 of the activity summary generation module 220 is software and/or routines for generating the activity summaries based on the categorized user activity information. The output generation module 316 receives information from the categorization module 304 and the ranking module 306 and generates activity summaries based on the categorized user activity information. In some implementations, the user may share the generated activity summary with other users, for example, by posting the activity summary on the user's social network portal. The post may be a public post where other users can view the activity summary. The post may also be a private post where selected users may view the activity summary.

Figure 4:
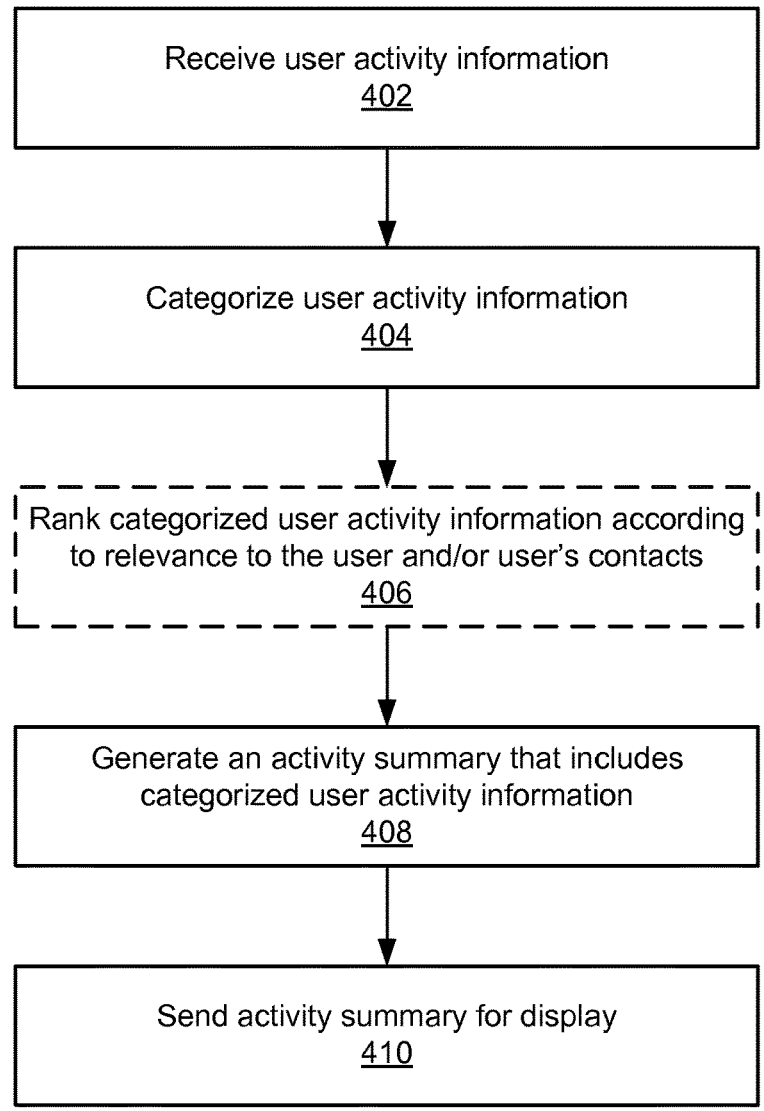
FIG. 4 is a flow chart illustrating an example method for generating activity summaries.

Referring now to FIG. 4, an example method 400 for generating activity summaries for a user 125 of the system 100 will be described. In some implementations, the method 400 is performed by the components of the network server 101, and specifically, by the components of the activity summary generation module 220. In one implementation, the method 400 begins when user activity information is received 402 by the user activity information receiver module 302. The user activity information is then categorized 404 by the categorization module 304. In some implementations, the categorized user activity information is ranked 406 according to relevance to the user by the ranking module 306. In some implementations, the categorized user activity information is ranked 406 according to relevance to the user's contacts by the ranking module 306. Activity summaries are then generated 408 by the output generation module 316 of the activity summary generation module 220. The activity summary includes the categorized user activity information. The activity summary is sent 410 for display on a user device 115 of a user 125. In some implementations, the user may share the generated activity summary with other users, for example, by posting the activity summary on the user's social network portal. The post may be a public post where other users can view the activity summary. The post may also be a private post where selected users may view the activity summary.

Figure 5:
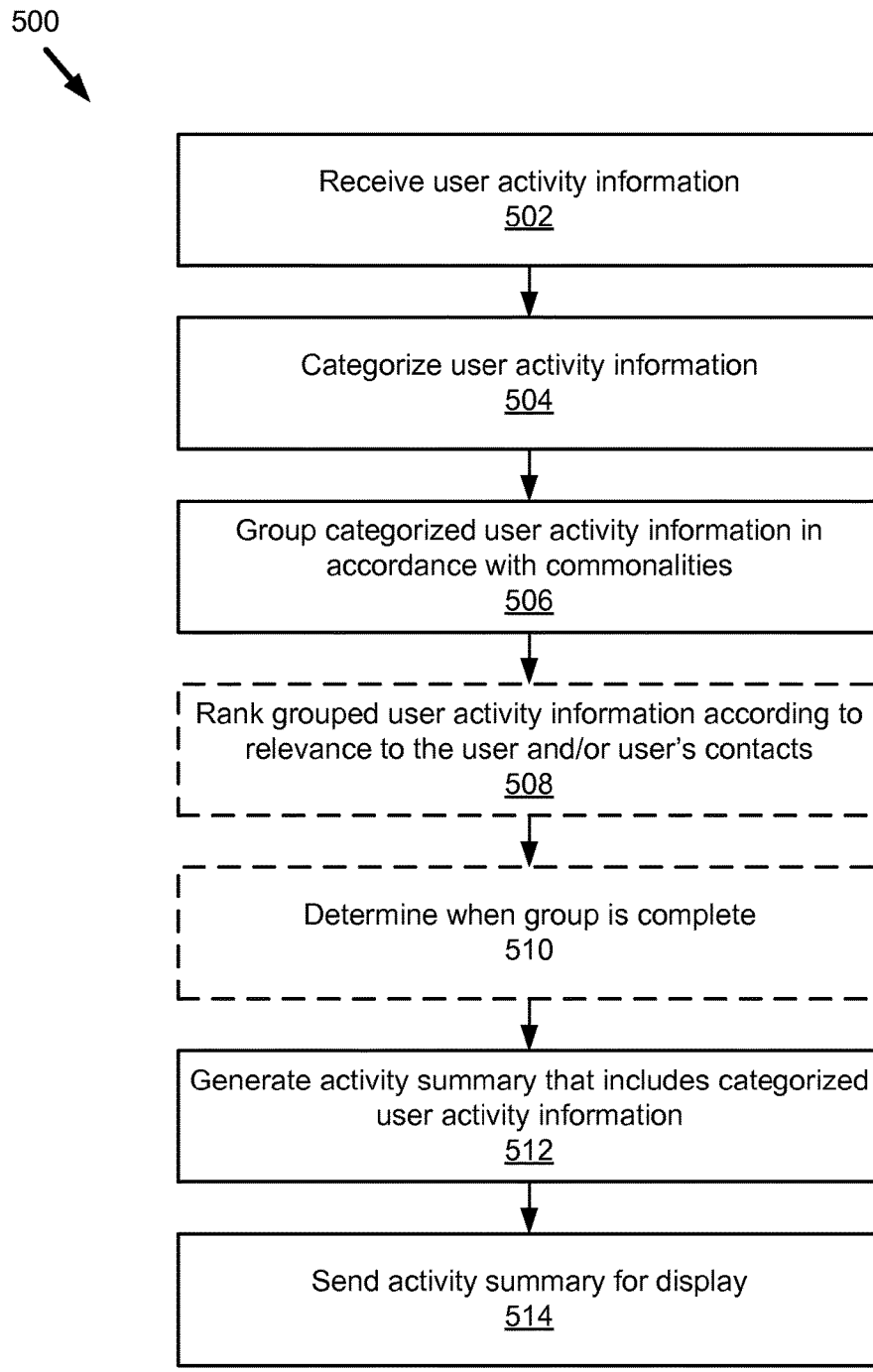
FIG. 5 is a flow chart illustrating an example method for generating activity summaries.

Referring now to FIG. 5, another example method 500 for generating activity summaries to a user 125 of the system 100 will be described. In some implementations, the method 500 is performed by the components of the network server 101, and specifically, by the components of the activity summary generation module 220. In one implementation, the method 500 begins when user activity information is received 502 by the user activity information receiver module 302. The user activity information may be information associated with audio (for example, songs) that that user 125 has listened to, pictures that the user has uploaded to the network server 101, videos that the user has watched, text posts that the user has input into the network server 101, and other information associated with the activity of the user 125. Additionally, user activity information may be information received from the application server 107 or application service 109 related to user activity on the application server 107 or application service 109. In some implementations, the user activity information may also be photos that the user has taken and location information associated with those photos. In some implementations, the activity information may also include the user's location information (or location information of the user's device), the user's calendar information, or information related to events that the user will be attending or has attended, or other information related to the user's activity. For example, if the application server 107 hosts a website that allows users to listen to music or watch videos, the user activity information regarding songs listened to or videos watch on the application server 107 may be sent to and received by the user data receiver module 302 of the activity summary generation module 220. In one implementation, a user's search history may also serve as a source for activity information.

The user activity information is then categorized 504 by the categorization module 304. In some implementations, the user activity information may be categorized according to a user identifier, a verb identifier associated with the user activity, a target associated with the user activity and a source. For example, a user identifier can be an anonymized identifier that uniquely identifies a particular user 125 of the system 100. The verb identifier associated with the user activity may be predefined according to the particular user activity. In some implementations, if a particular website or a particular application service 109 or application server 107 provides the user with the ability to perform more than one activity on that website, service or server, there may be more than one verb identifier associated with that website, service or server, and each verb identifier may be associated with a certain user activity. For example, if the user activity occurs on a website that hosts videos for viewing, a verb identifier associated with that website and activity may be "watch" or "watched" and the corresponding activity of watching videos that occurs on that website would be associated with "watched." In some implementations, the user activity information may also be categorized according to The categorization module 304 also groups 506 the categorized user activity information in accordance with commonalities identified among the user activity information. By grouping the user activity information in accordance with commonalities identified among the user activity information, the categorization module 304 helps to organize the user activity or online activity into interesting stories or comprehensive summaries of these activities. This categorized and organized user activity represents online experiences and may be helpful in conveying the user's life experiences when the experiences relate to a common theme. The categorization module 304 may group the user activity information. The user activity information may be grouped 506 based on relatedness (similar topic, similar content, etc.) of the user activity. Commonalities may include a location common to the user activity. Commonalities may also include an interest or topic common to the user activity. Groups of user activity created by the categorization module may therefore include different types of user activity. For example, the categorization module 304 may categorize and group together the user activity according to activity that the user performed online while the user was in Japan. In this example, categorized and grouped user activity, which eventually becomes output or displayed as the activity summary, may include activity and content such as the pictures the user posted of the user's trip to Japan, the places that the user visited while in Japan, and the items the user purchased online while the user was in Japan.

In some implementations, the categorization module 304 also groups 506 the categorized user activity information in accordance with commonalities identified among the user activity information to determine the beginning of a specific group in order to create a story from that grouping. In one implementation, a change in a user's location signals the beginning of a story. In one implementation, new photos signal the beginning of a story. In another implementation, a change in the user's location from their usual location signals the beginning of a story. In some implementations the user's usual location may be a specifically identified location (for example, a defined home location, or an identified work location). In other implementations, the user's usual location may be inferred from the user's location history, or from previously geo-tagged photos (e.g. where the user tends to spend most of his or her time).

In some implementations, the categorized user activity information is ranked 508 according to relevance to the user by the ranking module 306. In some implementations, the categorized user activity information is ranked 508 according to relevance to the user's contacts by the ranking module 306.

The output generation module 316 determines 510 when the groupings are complete. Certain signals or activity information are monitored and analyzed to determine the completion of a grouping or ending of a story. Specifically, certain signals such as photos, location, calendar, events and other user's information (which is linked to the first user) serve as sources for activity information and indications of the completion of a grouping or ending of a story. In one implementation, a user's search history may also serve as a source for activity information. In one implementation, a change in a user's location signals the ending of a story. In one implementation, a time limit may signal the ending of a story.

Activity summaries are then generated 512 by the output generation module 316 of the activity summary generation module 220. In some implementations, a notification that activity information is being received, processed and categorized is generated. In such implementations, such notifications may include a notification that a story is being created. In other implementations, a notification of the completed version activity summary is generated. The activity summary includes the categorized user activity information. The activity summary or notification is sent 514 for display on a user device 115 of a user 125. In some implementations, the user may share the generated activity summary with other users, for example, by posting the activity summary on the user's social network portal. The post may be a public post where other users can view the activity summary. The post may also be a private post where selected users may view the activity summary.

Figure 6:
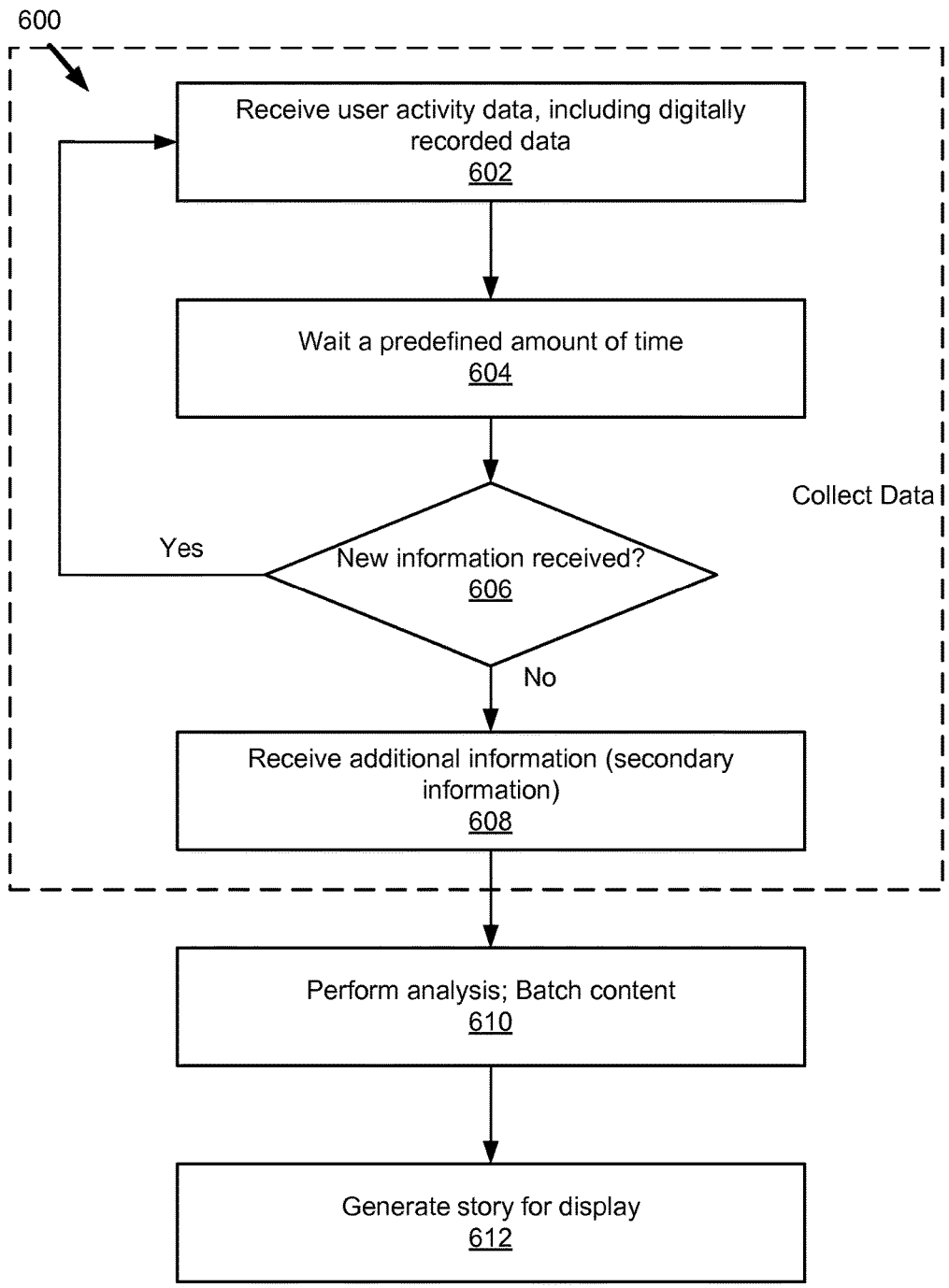
FIG. 6 is a flow chart illustrating another example method for generating activity summaries.

FIG. 6 is a flow chart 600 illustrating another example method for generating activity summaries. In one implementation, the method 600 begins when user activity information is received 602 by the user activity information receiver module 302. The user activity information may be information associated with audio (for example, songs) that that user 125 has listened to, pictures that the user has uploaded to the network server 101, videos that the user has watched, text posts that the user has input into the network server 101, and other information associated with the activity of the user 125. Additionally, user activity information may be information received from the application server 107 or application service 109 related to user activity on the application server 107 or application service 109. In some implementations, the user activity information may also be photos that the user has taken and location information associated with those photos. In some implementations, the activity information may also include the user's location information (or location information of the user's device), the user's calendar information, or information related to events that the user will be attending or has attended, or other information related to the user's online activity.

The user data receiver module 302 waits 604 a predefined period of time. This allows enough content and data to be received to be able to adequately create an activity summary. In some implementations, the user data receiver module 302 waits several hours, for example, one hour, two hours, three hours, four hours, etc. A determination 606 is performed to determine whether new information has been received. For example, whether the user has taken any new pictures within the predefined period of time. If new information has been received (606—Yes), the data receiver module 302 continues to receive 602 user activity information. If new information has not been received (606—No), analysis of the received information is performed 610. A more detailed description describing step 610 will be described below with regard to FIG. 7. Finally, an activity summary (or story) is generated 612 and sent for display.

Figure 7:
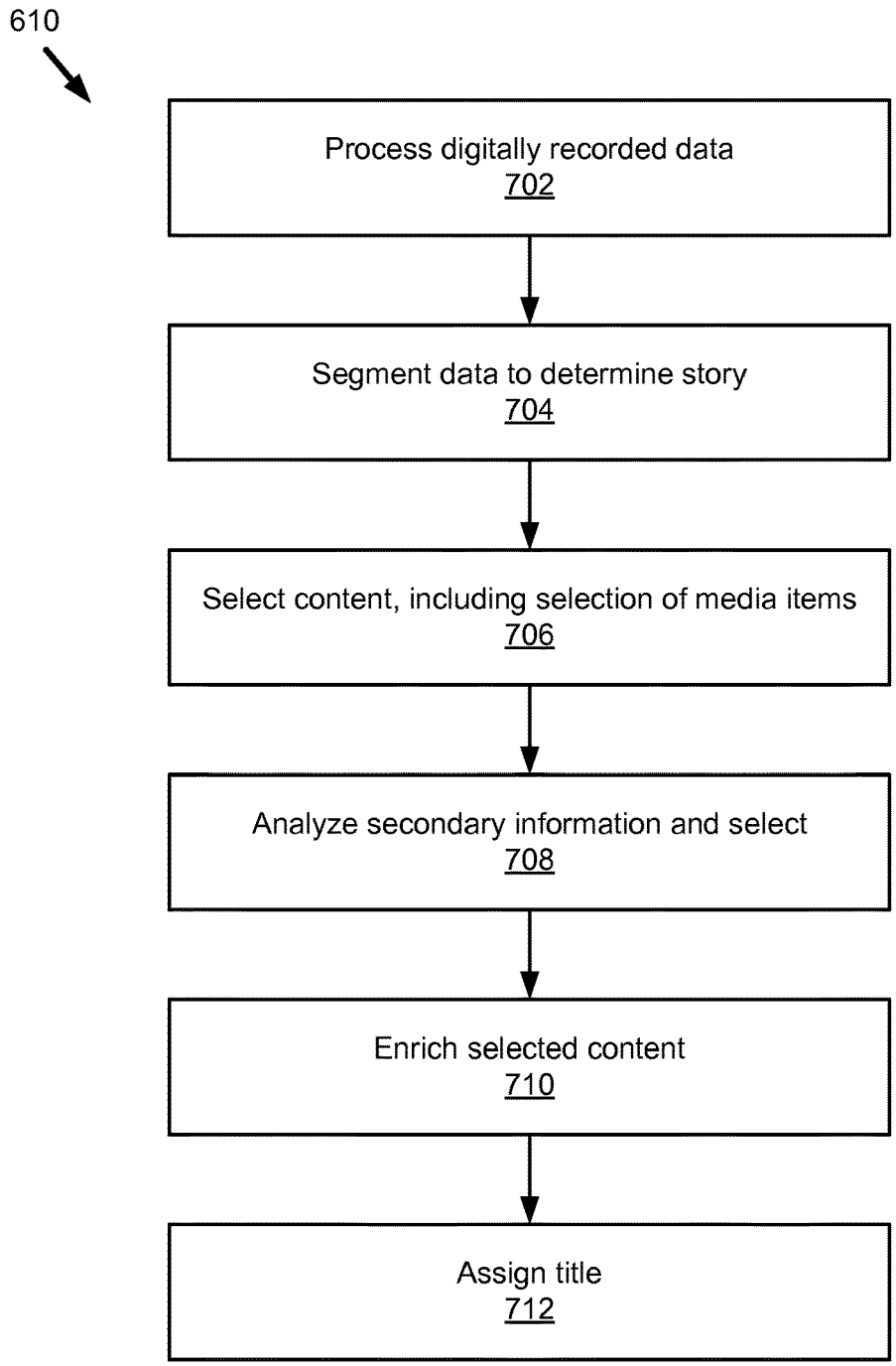
FIG. 7 is a flow chart illustrating an example method for performing data analysis to create an activity summary.

FIG. 7 is a flow chart 700 illustrating an example method for performing data analysis to create an activity summary. Data is processed 702 by the user activity information receiver module 302. Once enough data is received and processed, the data is analyzed and segmented 704 to determine and create an activity summary or story. In some implementations, segmentation is performed based on a commonality. Content is selected 706 to determine what content is included in the activity summary. The selection of the content includes selection of multimedia items, such as pictures and videos. Secondary information, such as user activity information or location information is analyzed 708. Other secondary information may include metadata associated with the content or multimedia item, or other information associated with the content or multimedia item. Once the content is selected and analyzed, the content is enriched 710 or enhanced with additional information based on the analysis of the secondary information. Using the selected content, a visual representation of generated and a title is assigned 712 that identifies the representation.

Figure 8:
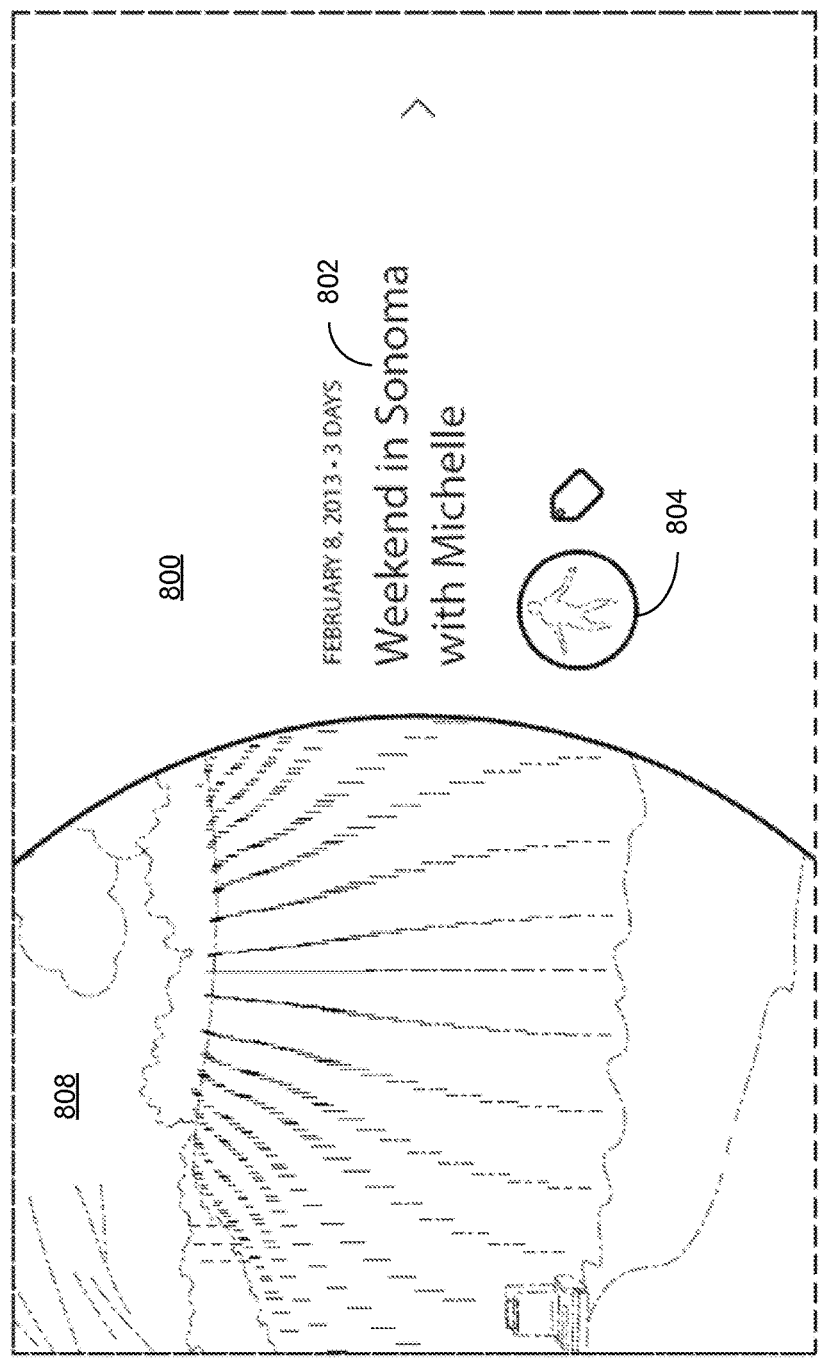
FIG. 8 is an example graphical user interface showing a title page of an activity summary.

FIG. 8 is an example graphical user interface 800 showing a title page of an activity summary. The graphical user interface 800 includes a title area 802. The graphical user interface 800 also includes a user icon 804. The graphical user interface 800 may also include a title picture 808.

Figure 9:
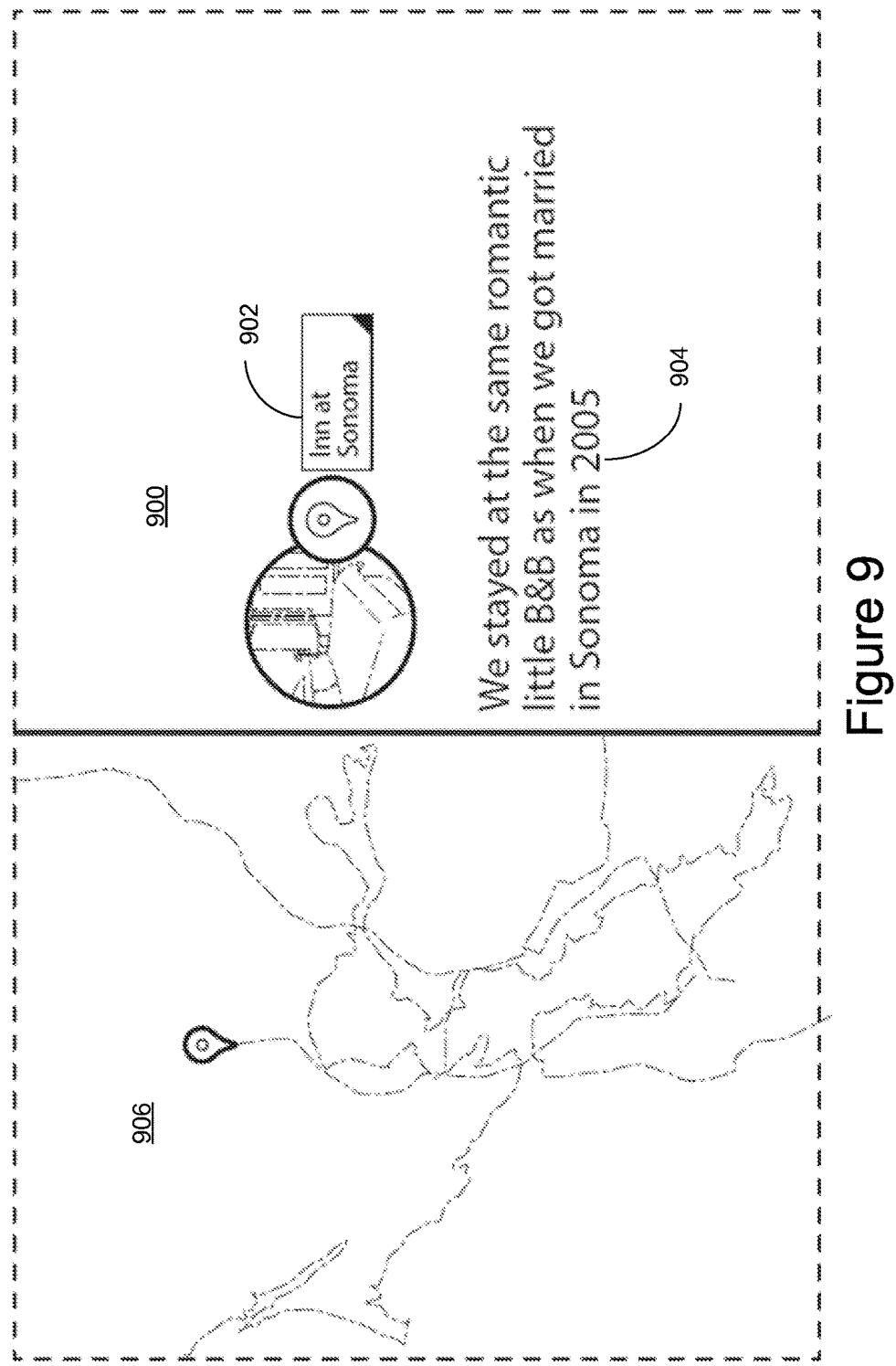
FIG. 9 is an example graphical user interface showing another page of an activity summary.

FIG. 9 is an example graphical user interface 900 showing another page of an activity summary. The graphical user interface 900 includes a location identifier 902 and a comment 904. The comment 904 may be entered by the user and/or viewers of the activity summary. According to this implementation, the graphical user interface also includes a route map 906. The route map 906 illustrates the location or route associated with the particular activity summary.

Figure 10:
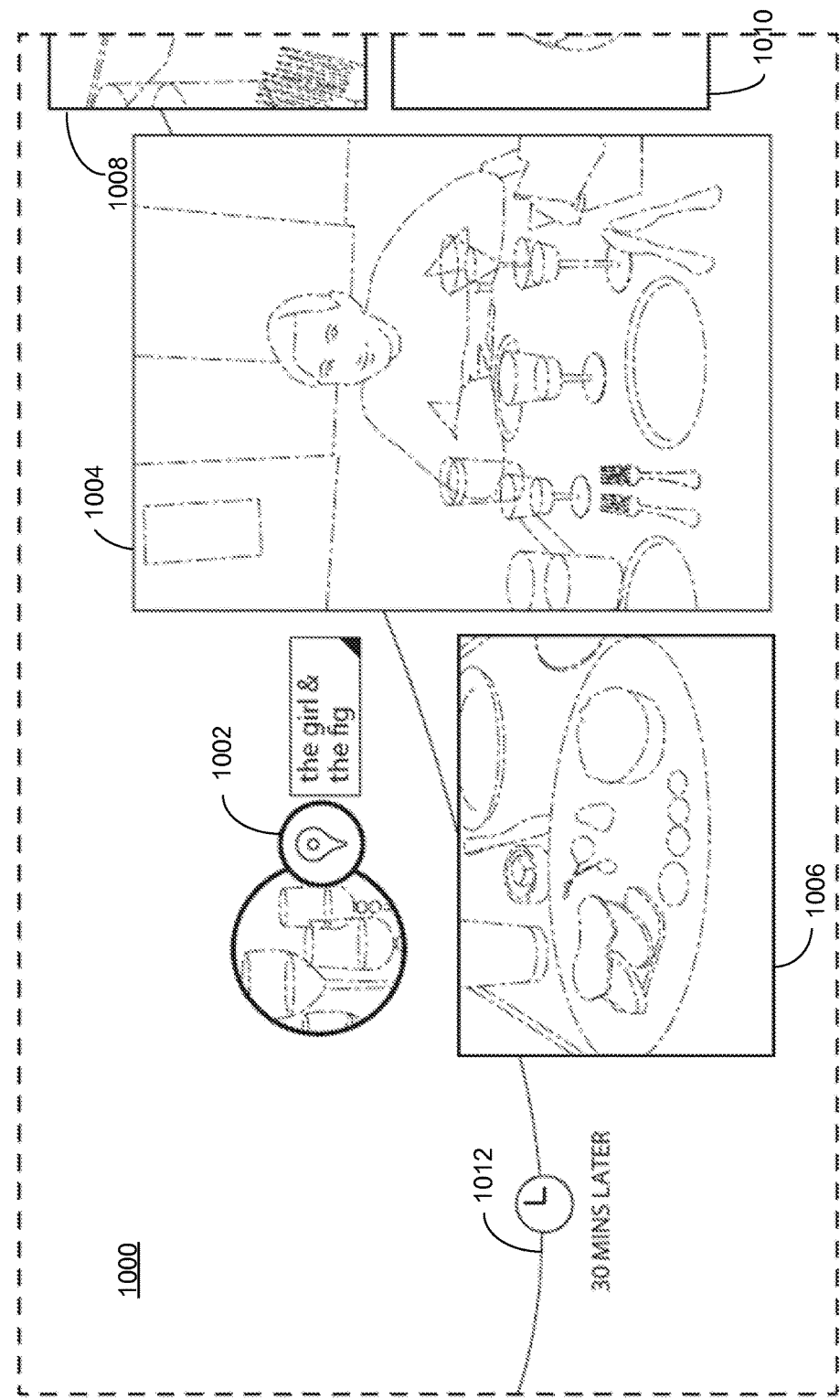
FIG. 10 is an example graphical user interface showing yet another page of an activity summary.

FIG. 10 is an example graphical user interface 1000 showing yet another page of an activity summary. The graphical user interface 1000 includes a location identifier 1002. For example, this location identifier may be added by the enrichment module 312. The graphical user interface 1000 also includes selected multimedia 1004, 1006, 1008, and 1010. The graphical user interface 1000 also includes a time interstitial 1012. The time interstitial 1012 indicates the relative passing of time in relation to the previous selected content that was displayed. As illustrated in this example, the time interstitial 1012 indicates an amount of time that has passed from the previous displayed content. According to another implementation, the time interstitial 1012 may indicated the exact time of the displayed selected media. In other implementations, the time interstitial 1012 may indicate day or date.

Figure 11:
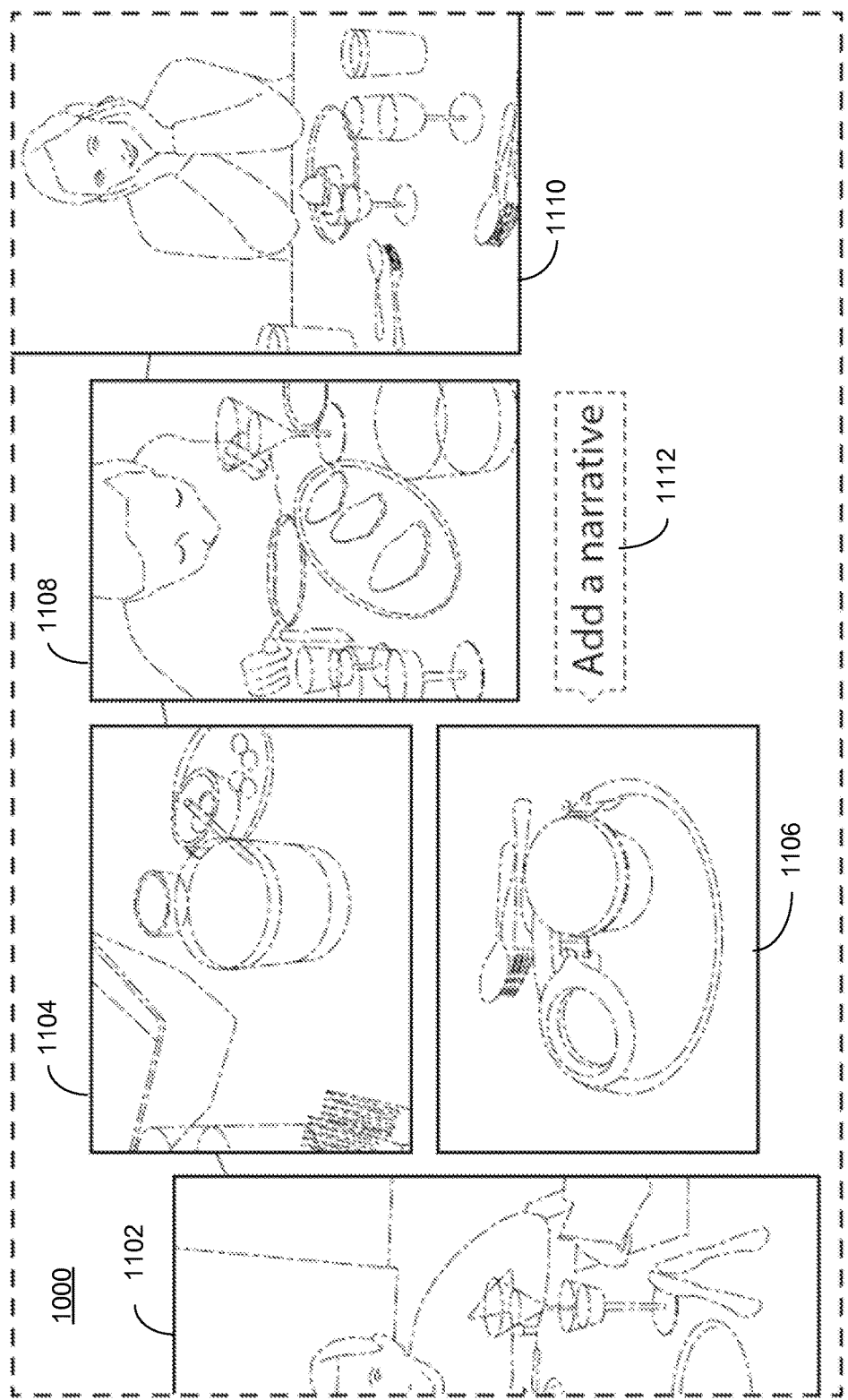
FIG. 11 is an example graphical user interface showing another page of an activity summary.

FIG. 11 shows the continuation of graphical user interface 1000 as the display moves along the timeline of the activity summary. In FIG. 11, the graphical user interface 1000 includes selected multimedia 1102, 1104, 1106, 1108, and 1110. In FIG. 11, the graphical user interface 1000 also includes a comment field 1112 where a user may enter text. The activity summary may be laid out in a horizontally or vertically scrollable configuration.

Figure 12:
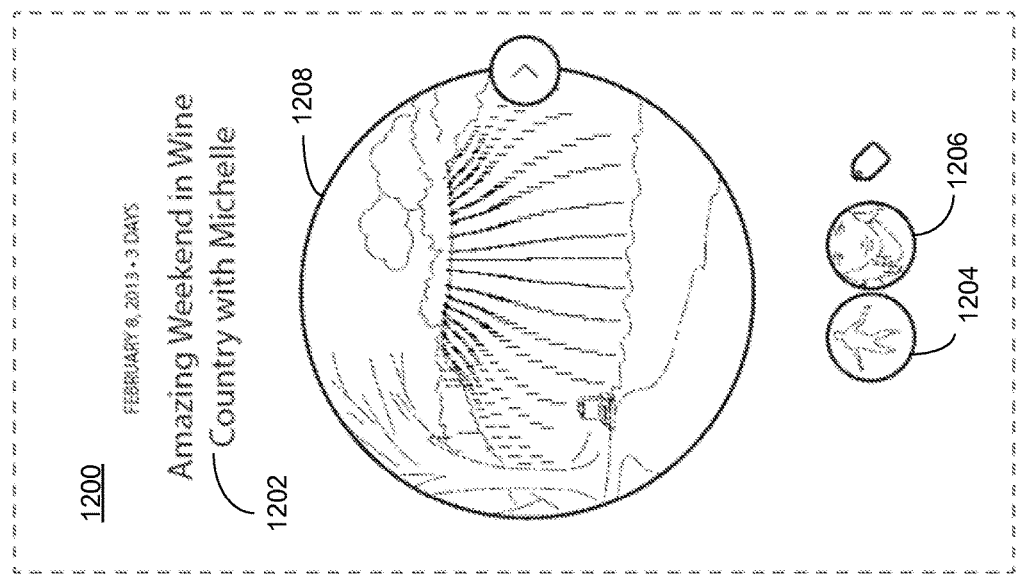
FIG. 12 is an example graphical user interface showing another example of a title page of an activity summary.

FIG. 12 is an example graphical user interface 1200 showing another example of a title page of an activity summary. Similar to the graphical user interface 800 depicted in FIG. 8, the graphical user interface 1200 includes a title area 1202. The graphical user interface 1200 also includes user icons 1204 and 1206. The graphical user interface 800 may also include a title picture 1208.

Figure 13:
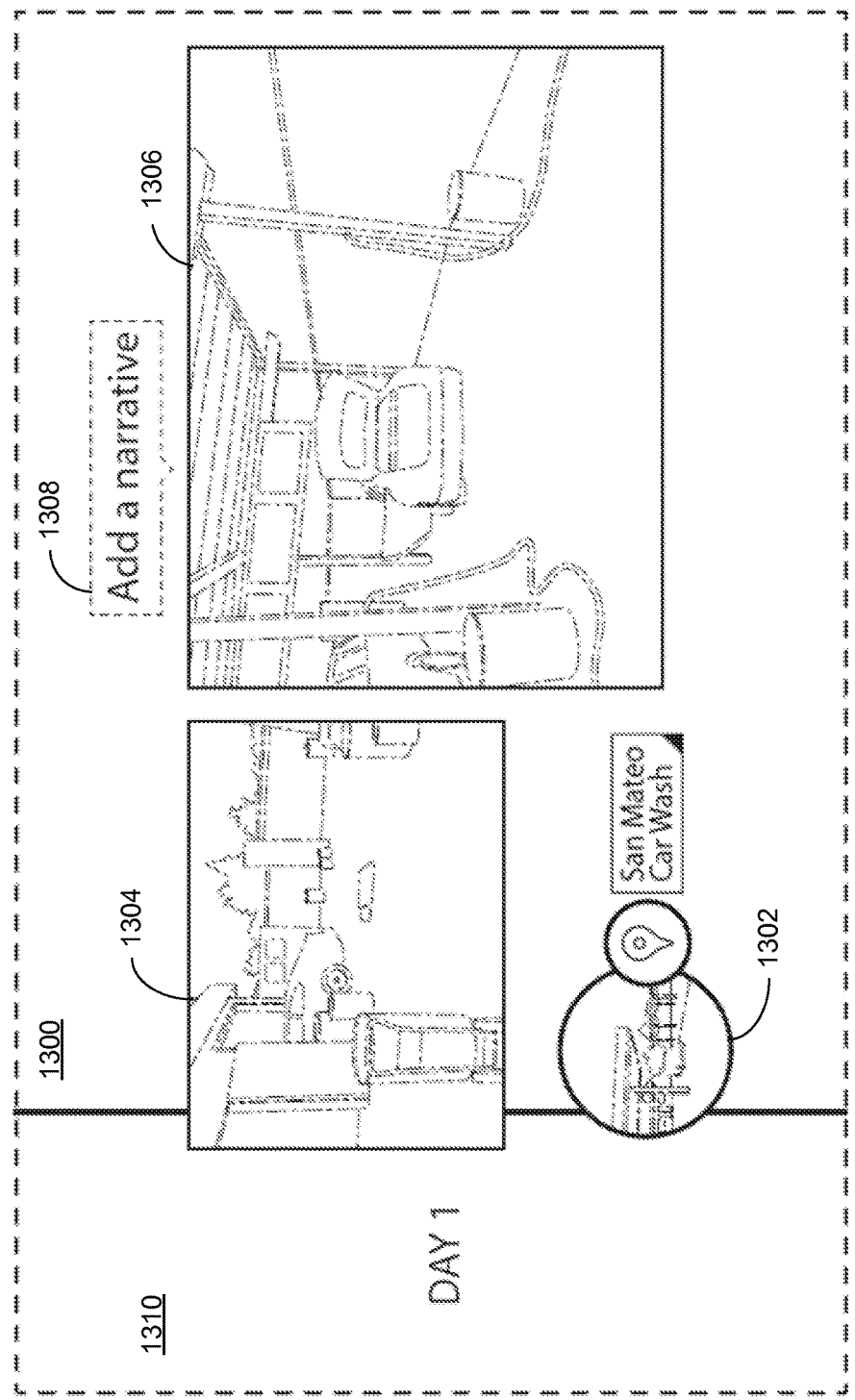
FIG. 13 is an example graphical user interface showing another page of an activity summary.

FIG. 13 is an example graphical user interface 1300 showing another page of an activity summary. The graphical user interface 1300 includes a location identifier 1302. The graphical user interface 1300 also includes selected multimedia 1304 and 1306. The graphical user interface 1300 also includes a time interstitial 1310. The graphical user interface 1300 also includes a comment field 1308 where a user may enter text.

Figure 14:
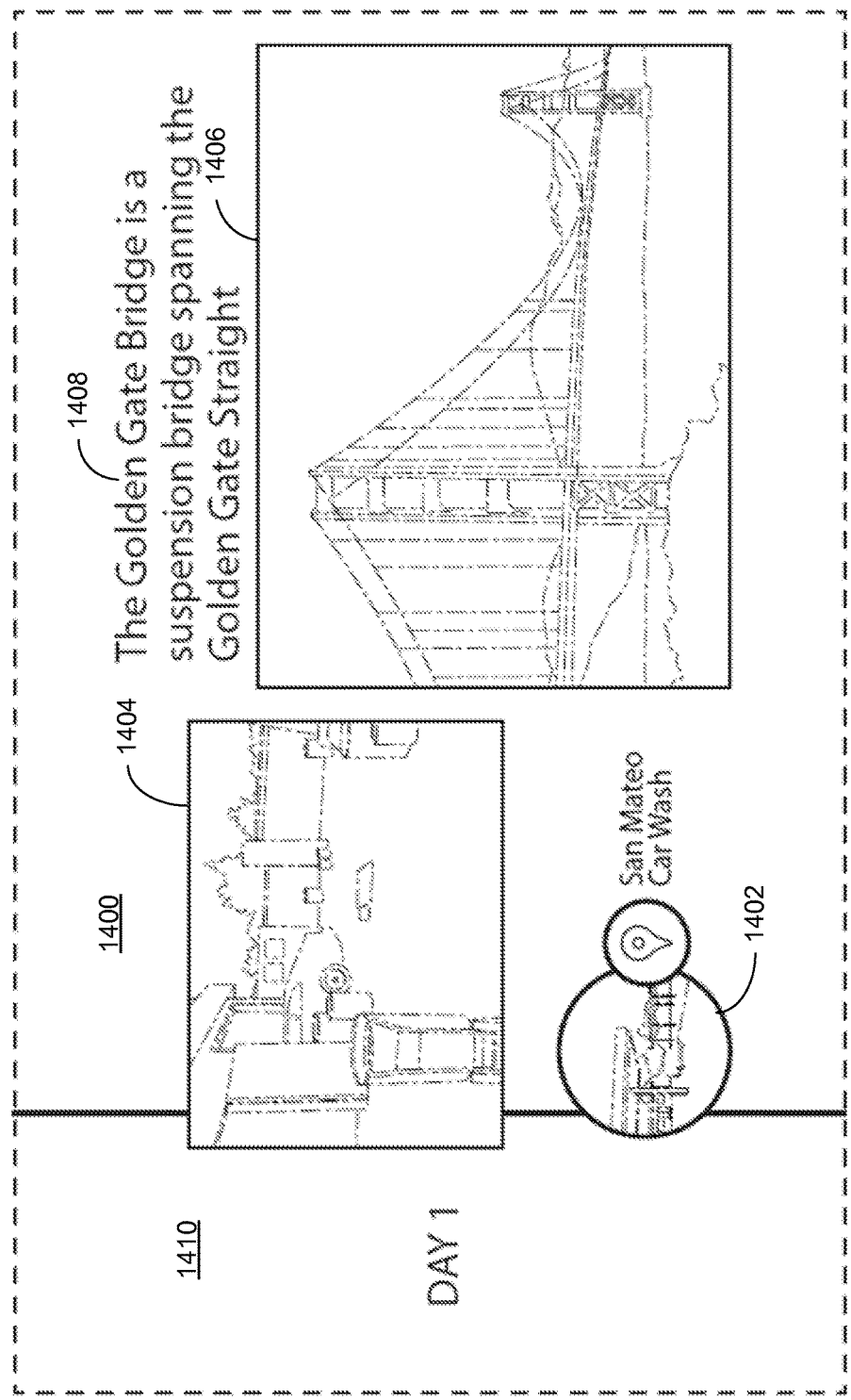
FIG. 14 is an example graphical user interface showing yet another page of an activity summary.

FIG. 14 shows another example of graphical user interface 1400. The graphical user interface 1400 includes a location identifier 1402. The graphical user interface 1400 also includes selected multimedia 1404 and 1406. The graphical user interface 1400 also includes a time interstitial 11410. In this illustration, the graphical user interface 1400 shows the comment field 1410 that was automatically generated with additional information by the enrichment module 312. In this example, there is a well-known landmark in the selected multimedia item 1406, which was identified and additional information added to enhance and enrich the display of information in the activity summary.

Figure 15:
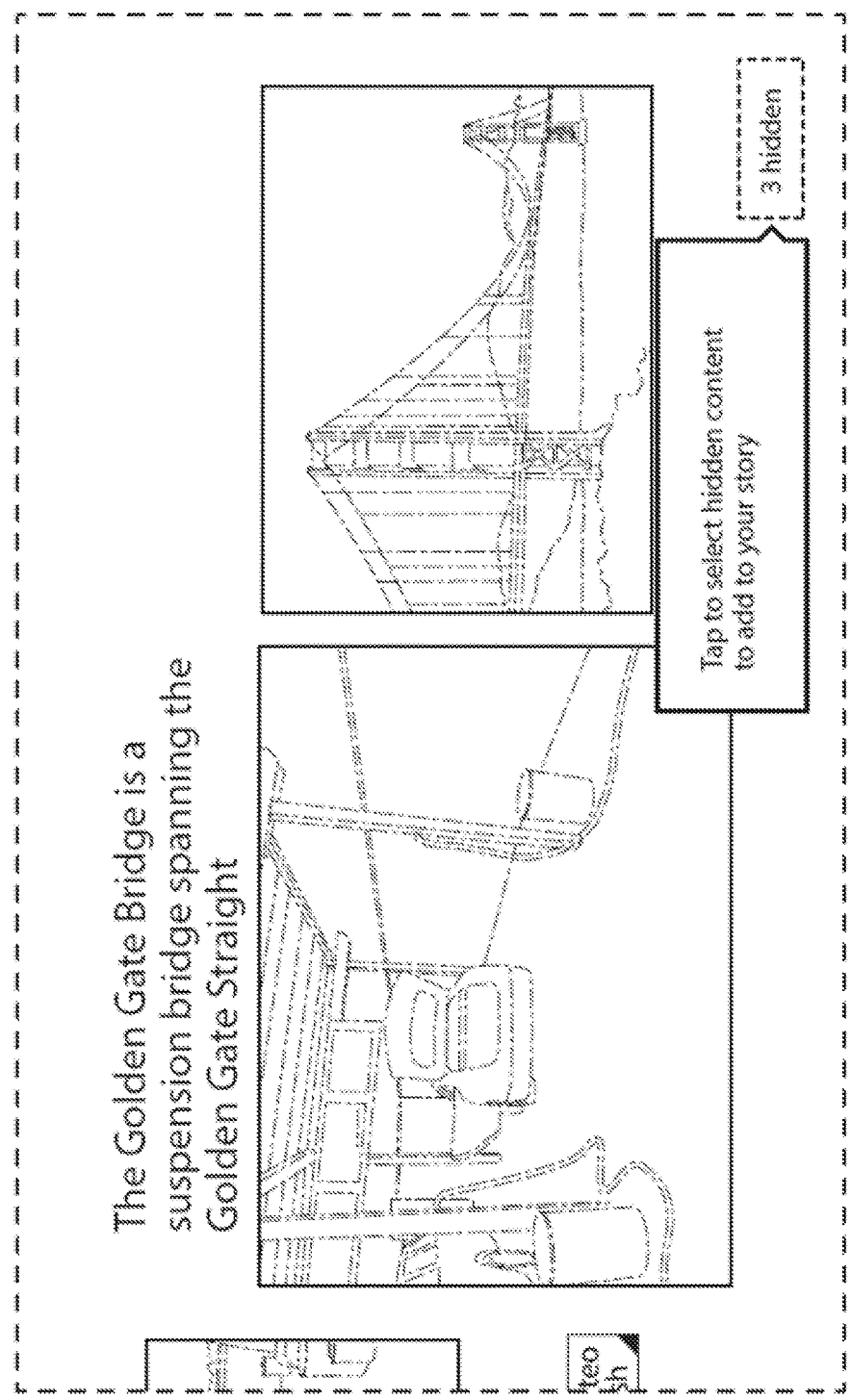
FIG. 15 is an example graphical user interface showing another page of an activity summary.

FIG. 15 shows the continuation of graphical user interface 1400 as the display moves along the timeline of the activity summary. In FIG. 15, the graphical user interface 1400 includes selected multimedia items.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The foregoing description of the implementations of the present disclosure has been presented for the purposes of illustration and description. It is not intended to be exhaustive or to limit the present implementations to the precise form disclosed. Many modifications and variations are possible in light of the above teaching. It is intended that the scope of the present implementations be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present implementations or their features may have different names, divisions and/or formats. Furthermore, as will be apparent to one of ordinary skill in the relevant art, the modules, routines, features, attributes, methodologies and other aspects of the present implementations can be implemented as software, hardware, firmware or any combination of the three. Also, wherever a component, an example of which is a module, of the present implementations are implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present implementations are in no way limited to implementation in any specific programming language, or for any specific operating system or environment. Accordingly, the disclosure is intended to be illustrative, but not limiting, of the scope of the present implementations, which is set forth in the following claims.

What is claimed is:

1. A computer-implemented method comprising:
receiving, using one or more computing devices, first activity information associated with a first activity of a first user targeting a first content item;
receiving, using the one or more computing devices, second activity information associated with a second activity of the first user targeting a second content item;
autonomously determining, from an analysis of the first content item within a plurality of content items, a first change in location of the first user by comparing a location associated with the first activity information with a reference location, wherein the determined first change in location indicates a beginning of a story to be visually represented by an activity summary including a plurality of activities of the first user;
autonomously determining, from an analysis of the second content item within the plurality of content items, a second change in location of the first user, based on a location associated with the second activity information, wherein the determined second change in location indicates an ending of the story;
autonomously determining timeline content items of the plurality of content items that are associated with activities of the first user between a time of the first activity information associated with the beginning of the story and a time of the second activity information associated with the ending of the story;

ranking the timeline content items according to a relevance of the timeline content items to the first user or relevance of the timeline content items to one or more contacts of the first user;

autonomously selecting a set of content items of the timeline content items for inclusion in the activity summary that represents the story, based on at least one of: the ranking of the timeline content items, time information associated with the timeline content items, location information associated with the timeline content items, or a quality of the timeline content items;

generating the activity summary based on the set of content items selected for inclusion in the activity summary, wherein the activity summary is a summary of one or more activities of the first user;

generating a visual representation of the activity summary; and sending, using the one or more computing devices, the visual representation of the activity summary for display.

2. The computer-implemented method of claim 1 wherein the plurality of content items includes at least one multimedia item.

3. The computer-implemented method of claim 1, further comprising:

autonomously enriching the activity summary by obtaining supplemental information based on recognition of content or a location associated with the activity summary and adding the supplemental information to the activity summary, wherein the supplemental information includes one or more of additional content and additional information.

4. The computer-implemented method of claim 1, further comprising:

autonomously determining a title associated with the activity summary.

5. The computer-implemented method of claim 1, further comprising: ranking activity information associated with the activities of the first user.

6. The computer-implemented method of claim 1, wherein the first activity information includes at least one of: a unique user identifier associated with the first user, a predetermined verb describing the first activity of the first user, or a target identifier identifying a first content item as a target of the first activity of the first user, wherein the second activity information includes at least one of: the unique user identifier associated with the first user, a predetermined verb describing the second activity of the first user, or a target identifier identifying a second content item as a target of the second activity of the first user; and further comprising:

autonomously categorizing activity information associated with activities of the first user, including the first activity information associated with the first activity of the first user and the second activity information associated with the second activity of the first user, wherein the categorizing is based on at least one of: the unique user identifier, predetermined verbs describing the activities including the predetermined verb describing the first activity and the predetermined verb describing the second activity, target identifiers identifying content items as targets of activities including the target identifier identifying a first content item and the target identifier identifying a second content item, or a commonality; and autonomously grouping a subset of categorized activity information associated with the activities of the first user into a first group of categorized activity information based on the first change in location of the first user indicating the beginning of the story, the second change in location of the first user indicating the ending of the story, and the categorization, wherein the activity summary further includes the first group of categorized activity information associated with the activities of the first user.

7. The computer-implemented method of claim 1, further comprising: receiving input from the first user modifying the activity summary.

8. The computer-implemented method of claim 1, further comprising:

autonomously generating a language-agnostic title using a template; and assigning the language-agnostic title to the story.

9. A computer-implemented method comprising:

receiving, using one or more computing devices, first activity information associated with a first activity of a first user, the first activity information including a unique user identifier associated with the first user, a predetermined verb describing the first activity of the first user, and a target identifier identifying a first content item as a target of the first activity of the first user;

receiving, using the one or more computing devices, second activity information associated with a second activity of the first user, the second activity information including the unique user identifier associated with the first user, a predetermined verb describing the second activity of the first user, and a target identifier identifying a second content item as a target of the second activity of the first user;

categorizing activity information associated with activities of the first user, including the first activity information associated with the first activity of the first user and the second activity information associated with the second activity of the first user, wherein the categorizing is based on the unique user identifier, predetermined verbs describing each activity including the predetermined verb describing the first activity and the predetermined verb describing the second activity, target identifiers identifying content items including the target identifier identifying the first content item, and the target identifier identifying the second content item, and a commonality identified among at least two of the activity information;

autonomously determining, from an analysis of the first content item within a plurality of content items, a first change in a location of the first user by comparing a location associated with the first activity information with a reference location, wherein the determined first change in location indicates a beginning of a story to be visually represented by an activity summary including a plurality of activities of the first user;

autonomously determining, from an analysis of the second content item within the plurality of content items, a second change in location of the first user, based on a location associated with the second activity information, wherein the determined second change in location indicates an ending of the story;

grouping a subset of the categorized activity information associated with the activities of the first user into a first group of categorized activity information based on the first change in location of the first user indicating the beginning of the story, the second change in location of the first user indicating the ending of the story, and the categorization;

autonomously selecting, a plurality of timeline content items for inclusion in the activity summary that are associated with activities of the first user between a time of the first activity information associated with the beginning of the story and a time of the second activity information associated with the ending of the story;

generating the activity summary that includes the plurality of timeline content items and the first group of the categorized activity information, wherein the activity summary is a summary of one or more activities of the first user;

generating a visual representation of the activity summary; and sending, using the one or more computing devices, the visual representation of the activity summary for display.

10. The computer-implemented method of claim 9, further comprising: ranking the first group of categorized activity information based on relevance to the first user and selecting of the plurality of select content items is further based on the ranking.

11. A computer program product comprising a non-transitory computer usable medium including a computer readable program, wherein the computer readable program when executed on a computer causes the computer to:

receive first activity information associated with a first activity of a first user targeting a first content item;

receive second activity information associated with a second activity of the first user targeting a second content item;

autonomously determine, from an analysis of the first content item within a plurality of content items, a first change in a location of the first user by comparing a location associated with the first activity information with a reference location, wherein the determined first change in location indicates a beginning of a story to be visually represented by an activity summary including a plurality of activities of the first user;

autonomously determine, from an analysis of the second content item within the plurality of content items, a second change in location of the first user, based on a location associated with the second activity information, wherein the determined second change in location indicates an ending of the story;

autonomously determine timeline content items of the plurality of content items that are associated with activities of the first user between a time of the first activity information associated with the beginning of the story and the second activity information associated with the ending of the story;

ranking the timeline content items according to a relevance of the timeline content items to the first user or relevance of the timeline content items to one or more contacts of the first user;

autonomously selecting a set of content items of the timeline content items for inclusion in the activity summary that represents the story, based on at least one of: the ranking of the timeline content items, time information associated with the timeline content items, location information associated with the timeline content items, or a quality of the timeline content items;

generate the activity summary that includes the set of content items, wherein the activity summary is a summary of one or more activities of the first user;

generate a visual representation of the activity summary; and send the visual representation of the activity summary for display.

12. A system comprising:
a processor; and
a memory storing instructions that, when executed, cause the system to:

receive first activity information associated with a first activity of a first user targeting a first content item;

receive second activity information associated with a second activity of the first user targeting a second content item;

autonomously determine, from an analysis of the first content item within a plurality of content items, a first change in a-location of the first user by comparing a location associated with the first activity information with a reference location, wherein the determined first change in location indicates a beginning of a story to be visually represented by an activity summary including a plurality of activities of the first user;

autonomously determine, from an analysis of the second content item within the plurality of content items, a second change in location of the first user, based on a location associated with the second activity information, wherein the determined second change in location indicates an ending of the story;

autonomously determine timeline content items of the plurality of content items that are associated with the activities of the first user between a time of the first activity information associated with the beginning of the story and a time of the second activity information associated with the ending of the story;

ranking the timeline content items according to a relevance of the timeline content items to the first user or relevance of the timeline content items to one or more contacts of the first user;

autonomously selecting a set of content items of the timeline content items for inclusion in the activity summary that represents the story, based on at least one of: the ranking of the timeline content items, time information associated with the timeline content items, location information associated with the timeline content items, or a quality of the timeline content items;

generate the activity summary, wherein the activity summary is a summary of one or more activities of the first user;

generate a visual representation of the activity summary; and send the visual representation of the activity summary for display.

13. The system of claim 12 wherein the plurality of content items includes at least one multimedia item.

14. The system of claim 12 comprising instructions that, when executed, cause the system to:

autonomously enrich the activity summary by obtaining supplemental information based on recognition of content or a location associated with the activity summary and adding the supplemental information to the activity summary, wherein the supplemental information includes one or more of additional content and additional information.

15. The system of claim 12, wherein the first activity information includes at least one of: a unique user identifier associated with the first user, a predetermined verb describing the first activity of the first user, or a target identifier identifying a first content item as a target of the first activity of the first user,
- wherein the second activity information includes at least one of: the unique user identifier associated with the first user, a predetermined verb describing the second activity of the first user, or a target identifier identifying a second content item as a target of the second activity of the first user; and
- further comprising instructions that, when executed, cause the system to:
  - autonomously categorize the activity information associated with activities of the first user, including the first activity information associated with the first activity of the first user and second activity information associated with the second activity of the first user, wherein the categorizing is based on at least one of: the unique user identifier, predetermined verbs describing the activities including the predetermined verb describing the first activity and the predetermined verb describing the second activity, target identifiers identifying content items as targets of activities including the target identifier identifying a first content item and the target identifier identifying a second content item, or a commonality; and
  - autonomously group a subset of categorized activity information associated with the activities of the first user into a first group of the categorized activity information based on the first change in location of the first user indicating the beginning of the story, the second change in location of the first user indicating the ending of the story, and the categorization,
  - wherein the set of content items is selected from the first group of the categorized activity information associated with the activities of the first user.

16. The system of claim 12 comprising instructions that, when executed, cause the system to:
- autonomously generate a language-agnostic title using a template; and
- assign the language-agnostic title to the story.

* * * * *